(12) United States Patent
Johnson et al.

(10) Patent No.: US 6,909,716 B1
(45) Date of Patent: Jun. 21, 2005

(54) SYSTEM AND METHOD FOR SWITCHING AND ROUTING DATA ASSOCIATED WITH A SUBSCRIBER COMMUNITY

(75) Inventors: Brian W. Johnson, Lucas, TX (US); Manlio D. Marquez, Plano, TX (US)

(73) Assignee: Intel Corporation, Santa Clara, CA (US)

( * ) Notice: Subject to any disclaimer, the term of this patent is extended or adjusted under 35 U.S.C. 154(b) by 921 days.

(21) Appl. No.: 09/823,601

(22) Filed: Mar. 30, 2001

(51) Int. Cl.[7] ............................ H04J 3/02; H04L 12/56
(52) U.S. Cl. ........................ 370/392; 370/401; 370/469
(58) Field of Search .............................. 370/392, 428, 370/469, 471, 473, 401, 402

(56) References Cited

U.S. PATENT DOCUMENTS

| | | | |
|---|---|---|---|
| 6,115,378 A | * | 9/2000 | Hendel et al. ............. 370/392 |
| 6,216,167 B1 | * | 4/2001 | Momirov ................... 709/238 |
| 6,424,659 B2 | * | 7/2002 | Viswanadham et al. .... 370/469 |
| 6,763,023 B1 | * | 7/2004 | Gleeson et al. ............ 370/392 |
| 6,775,271 B1 | * | 8/2004 | Johnson et al. ............ 370/352 |

OTHER PUBLICATIONS

U.S. Appl. No. 09/823,604, filed Mar. 30, 2001, entitled "System and Method for Switching and Routing Data Associated with a Subscriber Community," 45 pages.

* cited by examiner

Primary Examiner—Min Jung
(74) Attorney, Agent, or Firm—Blakely, Sokoloff, Taylor & Zafman LLP

(57) ABSTRACT

A system for switching and routing data associated with one or more subscribers within a subscriber community includes layer-2 switching functionality and an intermediate device, both within a first network access switch. The intermediate device is operable to receive data units from the layer-2 switching functionality and to selectively store first data units received by the intermediate device after layer-3 routing functionality has begun to process a data block comprising the first data units and before all other data units within the data block ahead of the first data units have been switched for communication and external device of layer 2 switching functionality of another network access switch.

32 Claims, 5 Drawing Sheets

SYSTEM AND METHOD FOR SWITCHING AND ROUTING DATA ASSOCIATED WITH A SUBSCRIBER COMMUNITY

CROSS-REFERENCE TO RELATED APPLICATIONS

This application is related to and filed concurrently with pending U.S. patent application Ser. No. 09/823,604, entitled "System and Method for Switching and Routing Data Associated with a Subscriber Community". These applications have been commonly assigned to Netensity, Inc.

TECHNICAL FIELD OF THE INVENTION

This invention relates in general to the field of data communications and in particular to a system and method for switching and routing data associated with a subscriber community.

BACKGROUND OF THE INVENTION

Historically, network bridges and routers have been built as standalone units. However, there are several limitations associated with the use of standalone units in a communications system to support multiple subscribers. Standalone units may have a limited number of available subscriber ports, and the physical reach of the individual subscriber lines coupling the subscribers to the units may also be limited. Further, economic considerations may limit the number of virtual circuits (VCs) that may be supported on each subscriber port. Where a unit is distributed, the number of VCs on the distribution ports between the distributed components of the unit may be as large as or even exceed the number of VCs between the unit and a central office (CO) or other external device. As a result, a large number of units may be required in order to accommodate a large subscriber community or a subscriber community spread over a relatively large area. These and other deficiencies have made previous systems inadequate for providing service to many subscriber communities.

SUMMARY OF THE INVENTION

According to the present invention, disadvantages and problems associated with previous techniques for communicating data associated with a subscriber community are substantially reduced or eliminated.

According to one embodiment of the present invention, a system for switching and routing data associated with one or more subscribers within a subscriber community includes layer-2 switching functionality within a first network access switch. The layer-2 switching functionality receives data units communicated by one or more external devices using one or more external links and switches the received data units for communication to an intermediate device within the first network access switch coupling the layer-2 switching functionality within the first network access switch to layer-3 routing functionality within the first network access switch. The intermediate device receives the switched data units from the layer-2 switching functionality, selectively communicates to the layer-3 routing functionality one or more first data units that have been received by the layer-2 switching functionality on an external link and are to be subsequently switched for communication to layer-2 switching functionality of another network access switch on an associated system link, the first data units containing layer-3 routing information for a data block including the first data units and a plurality of other data units, the first data units being communicated to the layer-3 routing functionality for processing including a determination of a system destination for the data block that includes an address of another network access switch that is associated with an external link coupled to the other network access switch, and selectively stores second data units, the second data units being data units within the data block that have been communicated to the intermediate device after the layer-3 routing functionality has begun to determine a system destination for the data block and before all other data units within the data block ahead of the second data units have been switched for communication to the layer-2 switching functionality of the other network access switch.

In another embodiment, a system for switching and routing data associated with one or more subscribers within a subscriber community includes layer-2 switching functionality within a first network access switch. The layer-2 switching functionality receives data units communicated by layer-2 switching functionality of one or more other network access switches using one or more system links and switches the received data units for communication to an intermediate device within the first network access switch coupling the layer-2 switching functionality within the first network access switch to layer-3 routing functionality within the first network access switch. The intermediate device receives the switched data units from the layer-2 switching functionality, selectively communicates to the layer-3 routing functionality one or more first data units that have been received by the layer-2 switching functionality on a system link and are to be subsequently switched for communication to an external device on an associated external link, the first data units containing incoming system destination information specifying an address of the first network access switch that is associated with that external link, the incoming system destination information allowing a data block including the first data units and a plurality of other data units to be switched and routed between two or more network access switches, the first data units being communicated to the layer-3 routing functionality for processing including formatting the first data units as standard layer-2 data units for switching and routing by external devices, and selectively stores second data units, the second data units being data units within the data block that have been communicated to the intermediate device after the layer-3 routing functionality has begun to format the first data units and before all other data units within the data block ahead of the second data units have been switched for communication to the external device.

Certain embodiments of the present invention may provide a number of important technical advantages. Unlike previous techniques, the present invention may allow the switching and routing of data in a communications system serving a subscriber community to be distributed among multiple network access switches within the system. Distributed switching and routing eases the burden on individual network access switches, thereby reducing their individual capacity requirements as well as their associated costs. Distributed switching and routing also reduces entry-level costs associated with initially setting up a communications system to serve a subscriber community. A single relatively inexpensive network access switch can accommodate the switching and routing demands of a relatively small subscriber community and, as the number of subscribers in the community grows, the system may be incrementally scaled to include additional network access switches according to particular needs.

In addition, performing layer-3 routing of ATM cells at their point of ingress into the system (a first network access switch) and formatting the cells with system destination information for communication within the system may allow the cells to be switched in layer-2 fashion (without layer-3 routing) at all intervening network access switches between the point of ingress into and the point of egress from the system (a second network access switch). In this case, layer-3 routing need only be performed again at the point of egress, where the cells are reformatted as standard ATM cells for communication to external devices. Reducing the amount of layer-3 routing that must be performed in communicating cells through the system may improve speed, conserve network resources, and provide other benefits.

The present invention may also allow for increased circuit concentration to reduce or eliminate the need to allocate a VC to each subscriber in the community that has a logical connection to a CO. Such circuit concentration may reduce the expense of the individual network access switches while maintaining their usefulness as the system is scaled to incorporate additional network access switches. For example, it may reduce costs associated with maintenance of the system and of the logical connections to the CO. It may also reduce the hardware requirements and the size of the VC table that the system hardware may use, further reducing costs associated with the system. Additionally, the present invention may allow for simpler switching and routing functionalities, thereby permitting the concentration of complexity associated with a large number of VCs into a single unit providing a connection to the CO. Moreover, the concentration of data traffic flowing bidirectionally between a wide area network (WAN) port and multiple subscriber ports into a single VC over a WAN link, to provide a connection to an Internet service provider (ISP) via the CO for example, may reduce the number of VCs that need to be supported by the CO.

When multiple VCs are concentrated into a single VC, it may be difficult to differentially shape traffic flowing to local ports. Since local ports often have little queuing capability, such traffic shaping may be desirable or even necessary. The present invention allows for the differential shaping of traffic flowing to local ports, which may be dynamically adjusted, enabling the local ports to train to varying line speeds. The present invention also allows for the combination of the demultiplexing function (of the concentrated VCs to multiple ports) and traffic-shaping function in a way that reduces the cost of performing both functions.

Systems and methods incorporating one or more of these or other technical advantages are well suited for switching and routing data associated with subscriber communities. Other technical advantages are readily apparent to those skilled in the art from the following figures, descriptions, and claims.

BRIEF DESCRIPTION OF THE DRAWINGS

To provide a more complete understanding of the present invention and the features and advantages thereof, reference is now made to the following descriptions taken in conjunction with the accompanying drawings, in which.

DETAILED DESCRIPTION OF THE INVENTION

Figure 1:
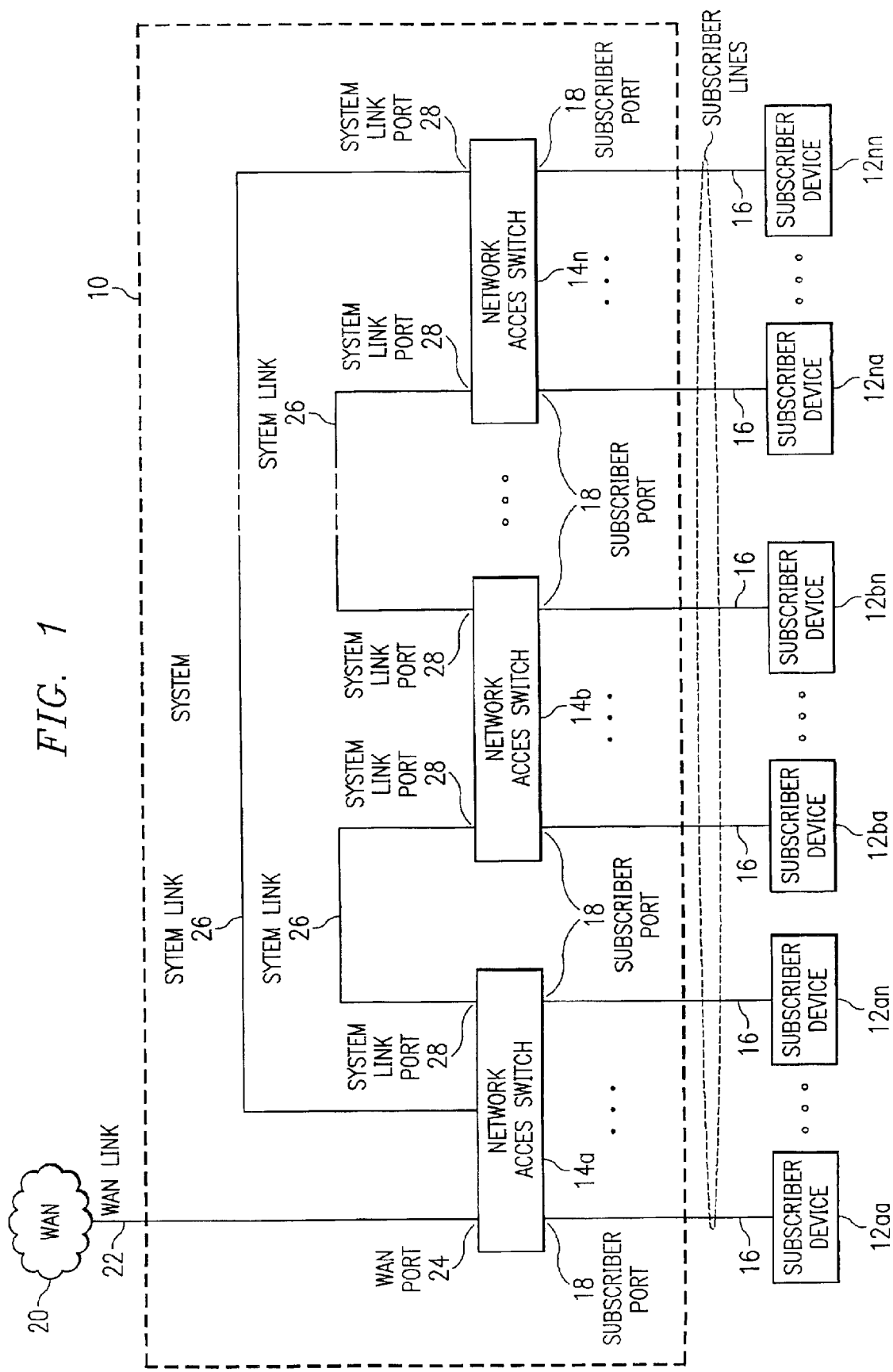
FIG. 1 illustrates an exemplary system for switching and routing data associated with a subscriber community.

FIG. 1 illustrates an exemplary system 10 for switching and routing data associated with a subscriber community. The subscriber community may include one or more businesses, apartment complexes, retirement communities, correctional facilities, or any other communities in which subscribers share communications infrastructure and resources. Each subscriber in the served community may have one or more associated telephones, personal computers, facsimile machines, or other devices to interface with the public switched telephone network (PSTN) or any other telephone network; a data network such as a local area network (LAN), metropolitan area network (MAN), WAN, or a global network such as the Internet; or any other suitable wireline, wireless, or other network. Such devices may be referred to as subscriber devices 12.

Subscriber devices 12 are coupled to one or more network access switches 14 using subscriber lines 16 and associated subscriber ports 18. Each network access switch 14 may support traffic associated with one or more subscriber devices 12, including but not necessarily limited to signals communicated to and from associated subscribers. For example, in exemplary system 10, network access switch 14a handles data associated with subscriber devices 12aa–12an, network access switch 14b handles data associated with subscriber devices 12ba–12bn, and so on. In one embodiment, subscriber lines 16 include asymmetric or other digital subscriber lines (xDSL) and communicate xDSL signals that may include, depending on traffic characteristics at the time, voice signals, video signals, multimedia signals, data signals, or other suitable signals in any appropriate combination. Reference to signals or the like is meant to encompass any appropriate calls, traffic, or other signals.

In the exemplary configuration of FIG. 1, network access switch 14a is coupled to WAN 20 using WAN link 22 and associated WAN port 24. WAN link 22 provides a single logical link between network access switch 14a and WAN 20. In one embodiment, WAN link 22 includes a T1 or other suitable link that supports Asynchronous Transfer Mode (ATM), Internet Protocol (IP), Frame Relay (FR), or any other suitable packet-based protocol. WAN link 22 may include any wireline, wireless, optical or other communications link providing suitable wideband or broadband characteristics over a distance of interest, often the distance between network access switch 14a and a CO within the PSTN. In one embodiment, only one network access switch 14 in system 10 supports a WAN link 22, for cost savings, reduced complexity, or any other suitable reason. However, the present invention contemplates more than one WAN link 22 for system 10 to provide, for example, redundancy and increased fault tolerance. In this case, if one of multiple WAN links 22 fails, the capacity of system 10 may be decreased, but communications to WAN 20 on other WAN links 22 will still be available. One or more WAN links 22 may be associated with system 10 in any appropriate manner. For example, each WAN link 22 may be coupled to a different network access switch 14.

Signals are communicated between network access switches 14 using system links 26 and associated system link ports 28. Although an exemplary stacked "ring" topology is shown, the present invention contemplates any number of network access switches 14 coupled to one another using a ring, daisy chain, mesh, or any other appropriate system topology. The topology may or may not provide redundancy in the interconnection of network access switches 14. In one embodiment, network access switches 14 "discover" the configuration of system 10 by exchanging suitable messages across system links 26. The messages may be used, for example, to build routing tables, establish traffic priorities, and the like. Because network access switches 14 may be configured to appear to external devices as a single distributed router, network bridge, or other unit, individual VCs may be concentrated into larger "carrier" VCs by encoding destination information into the VC number, as described more fully below, in a way that permits signals to be communicated among network access switches 14 using a reduced number of VCs. Such VCs are logically "box-to-box," providing logical connections between the switching and routing functionalities within network access switches 14 at the end of each of the system links 26.

Each network access switch 14 may handle signals that need to be communicated to other network access switches 14 using corresponding system links 26. For example, in the exemplary configuration illustrated in FIG. 1, network access switch 14a may communicate its local signals to adjacent network access switches 14b, 14n, or both, network access switch 14b may communicate its local signals to adjacent network access switches 14a, 14n, or both, and so on. Since each network access switch 14 may not support its own WAN link 22 or associated WAN port 24, signals bound for WAN 20 and signals received on WAN link 22 may need to traverse one or more system links 26 before reaching their destination. Similarly, subscriber devices 12 coupled to network access switch 14 may need to communicate with subscriber devices coupled to other network access switches 14. Each system link 26 preferably has at least the same bandwidth capacity as WAN link 22, such that signals received on WAN link 22 are not undesirably slowed or otherwise impeded as they travel to their destinations, possibly through multiple system links 26, even when traffic associated with one or more network access switches 14 is unusually heavy. Moreover, the switching and routing components of each network access switch 14 are preferably able to process the maximum traffic associated with system 10, such that the overall traffic flow is not unduly slowed or otherwise impeded within a particular network access switch 14 even when the traffic associated with that network access switch 14 is unusually heavy. Network access switches 14 may each include one or more system link ports 28, such that any desired number of paths between network access switches 14 may be supported with no shared points of failure other than the network access switches 14 themselves.

The coupling of multiple network access switches 14 using system links 26 may provide relatively inexpensive incremental growth, fewer single points of failure, increased fault tolerance, and other benefits. For example, for fault tolerance benefits, network access switches 14 may be coupled in the stacked daisy chain configuration shown, such that each network access switch 14 is coupled to two adjacent network access switches 14 and signals may be communicated between any of the non-failing network access switches 14 (assuming only one network access switch 14 in the configuration has failed). Since each network access switch 14 may support a specified number of subscriber lines 16, incremental growth may be achieved by adding another network access switch 14 and associated system links 26 to system 10, rather than replacing one or more network access switches 14 with other network access switches 14 having greater capacity.

Figure 2:
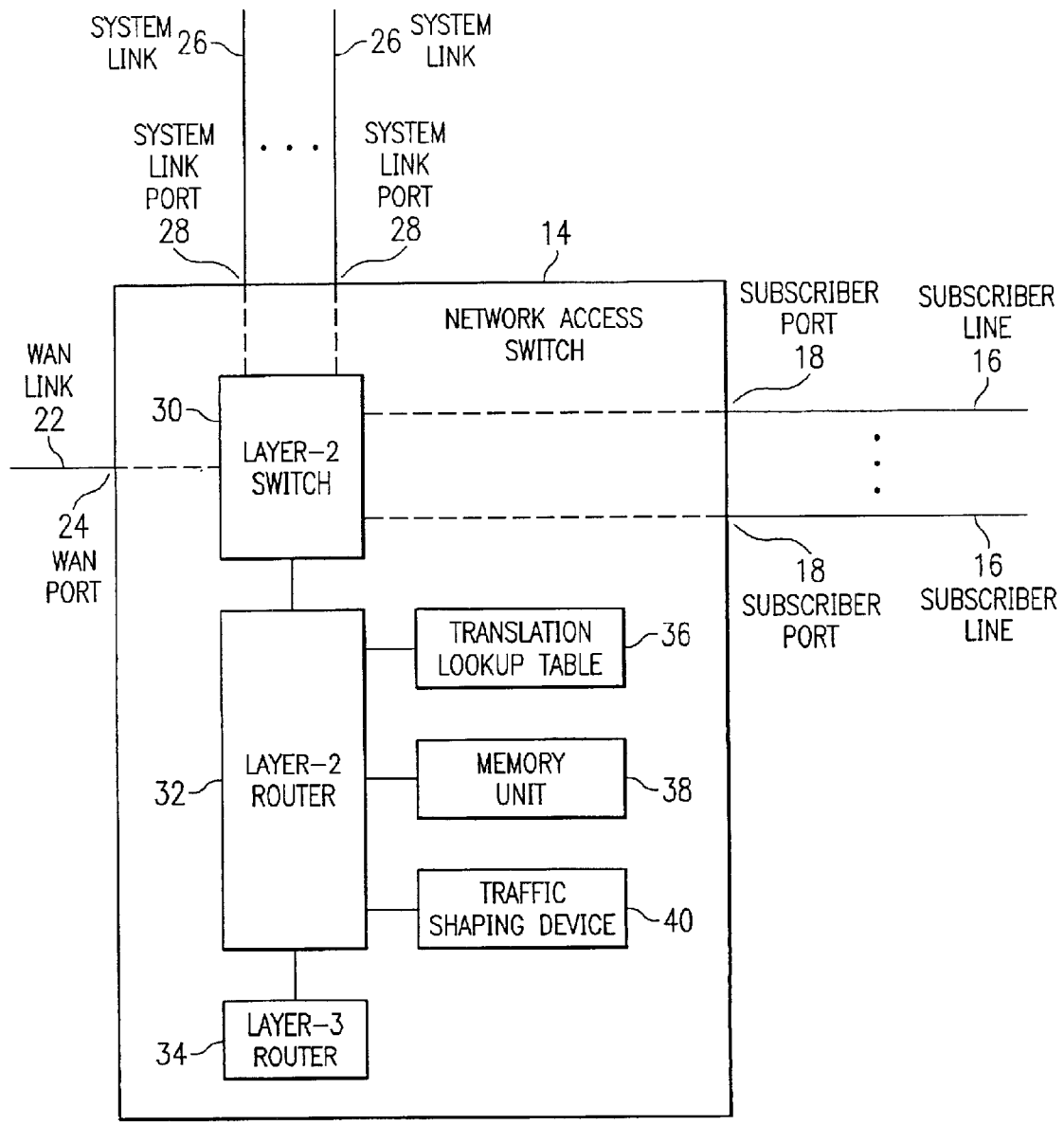
FIG. 2 illustrates an exemplary network access switch for switching and routing data associated with a subscriber community.

FIG. 2 illustrates an exemplary network access switch 14 coupled to one or more subscriber devices 12 using associated subscriber lines 16 and subscriber ports 18, to one or more other network access switches 14 in system 10 using associated system links 26 and system link ports 28, and to WAN 20 using associated WAN link 22 and WAN port 24. In one embodiment, switch 14 operates in an ATM environment wherein signals are communicated in cells, which may be concatenated to form frames. Although cells and frames are primarily described, the present invention contemplates signals being communicated using any suitable data units and data blocks, respectively. Accordingly, reference to cells is meant to include any suitable data units and reference to frames is meant to include packets, datagrams, or any other suitable data blocks, where appropriate. Cells may enter and exit network access switch 14 through WAN port 24, subscriber ports 18, and any other suitable ports associated with devices external to network access switch 14. The present invention contemplates any suitable devices coupled to network access switch 14 in any suitable manner.

In one embodiment, some or all of the cells communicated between network access switches 14 on system links 26 are formatted such that they contain system destination information specifying destinations for the cells. The system destination information for a cell specifies a system destination associated with a network access switch 14 within system 10, as opposed to any subsequent non-system destination external to system 10, such as at a subscriber device 12, a CO, or another device that is not a network access switch 14. System destination information may include any suitable information that may be used by components of system 10 to switch and route cells to their intended system destinations. For example, system destination information may specify an address of a particular subscriber port 18, WAN port 24, or other suitable port of a particular destination network access switch 14. The particular port may include a logical port representing multiple physical ports used in coupling a single associated device to the destination network access switch 14, for example, to provide increased fault tolerance. Reference to port or address may include a port, a network address, a port derived from a network address, or other suitable address identifying a destination, where appropriate.

Network access switch 14 includes a layer-2 switch 30, a layer-2 router 32, and a layer-3 router 34. Layer-2 switch 30, layer-2 router 32, and layer-3 router 34 may be, in whole or in part, integral to or separate from one another and may be, in whole or in part, logically separate rather than physically separate entities. Layer-2 switch 30 is preferably implemented using one or more application-specific integrated circuit (ASIC) devices, although layer-2 switch 30 may be implemented in software or in any other appropriate manner according to particular needs. Similarly, layer-2 router 32 and layer-3 router 34 may be implemented using one or more ASIC devices, in software, or in any other suitable manner.

In general, layer-2 switch 30 provides layer-2 switching functionality. Layer-2 switching functionality is appropriate for cells that are normally transported end-to-end by dedicated ATM switched VCs (SVCs) or permanent VCs (PVCs). Layer-2 switch 30 may switch cells out of network access switch 14 in a number of ways, depending on particular needs. For example, in one embodiment, layer-2 switch 30 switches the first cell of a frame out of network access switch 14 according to system destination information in the first cell and simply switches remaining cells of the frame to the destination of the first cell. In another embodiment, layer-2 switch 30 switches cells out of network access switch 14 according to system destination information in each cell of each frame.

Layer-2 router 32 performs tasks such as receiving incoming cells from layer-2 switch 30, making layer-2 destination decisions, or selectively communicating appropriate cells to layer-3 router 34 for processing, as described more fully below. Reference to the processing of cells by layer-3 router 34 is meant to encompass performance of any appropriate layer-3 task. Layer-2 router 32 may also store appropriate cells waiting to be switched out of network access switch 14 and regulate the rate of transmission of cells exiting system 10, as described more fully below.

Cells communicated to network access switch 14 are received at layer-2 switch 30 and communicated to layer-2 router 32. Layer-2 switch 30 may receive cells communicated on associated subscriber lines 16, on associated WAN link 20, or on associated system links 26. Layer-2 router 32 selectively communicates certain of the incoming cells to layer-3 router 34 according to any appropriate criteria. Criteria for selectively communicating a cell to layer-3 router 34 may include the presence of layer-3 routing information in the cell, the location of the cell (which may be known to contain layer-3 routing information) in a corresponding frame, the source of the cell, the destination of the cell, the presence of system destination information in the cell, any other suitable criteria, singly or in any suitable combination. The selective communication of certain cells from layer-2 router 32 to layer-3 router 34 provides a number of technical advantages. For example, such selective communication may result in there being fewer cells for layer-3 router 34 to process than if all cells were communicated from layer-2 switch 30 to layer-3 router 34, improving the efficiency and other characteristics of system 10.

An advantage of the present invention may be that intervening network access switches 14 between the network access switch 14 at the point of entry into system 10 and the network access switch 14 at the point of exit from system 10 need not perform layer-3 processing of cells, improving speed, conserving network resources, and providing other benefits. In one embodiment, at the first network access switch 14 reached by incoming cells entering system 10 (the point of ingress into system 10 for these cells), layer-2 router 32 selectively communicates to layer-3 router 34 those incoming cells that contain layer-3 routing information for the associated frames. A frame may need to be switched out of the same network access switch 14 onto WAN link 22 or a subscriber line 16. Alternatively, a frame may need to traverse one or more system links 26 before reaching its destination, for example, if the frame is bound for a subscriber device or other external device coupled to another network access switch 14 within system 10. Layer-2 router 32 may determine whether a frame needs to traverse one or more system links 26 by comparing the information contained in one or more cells within the frame to one or more entries in a lookup table 36 or in any other suitable manner. Regardless of the point of egress form system 10, layer-3 information is communicated to layer-3 router 34 at the point of ingress into system 10.

Layer-2 router 32 may determine whether cells contain layer-3 routing information in a number of ways. In one embodiment, layer-2 router 32 scans the contents of cells for layer-3 routing information, such as an IP address, for the associated frame. This may be preferable when, for example, the layer-3 routing information associated with the frame is contained in more than one cell within the frame. In another embodiment, it is assumed that only the first cells of frames contain layer-3 routing information, and layer-2 router 32 selectively communicates to layer-3 router 34 those cells that are the first cells of the associated frames. Although described in connection with the first cells of frames, any one or more cell at any location(s) in a frame may contain layer-3 routing information and be communicated to layer-3 router 34 accordingly.

Layer-2 router 32 may determine whether a cell is the first cell of a frame in any number of ways. In one embodiment, layer-2 router 32 detects the first cell of a frame by scanning cell payloads for data patterns identifying the first cell of a frame. In another embodiment, layer-2 router 32 detects the last cell of a frame, and the following cell is designated the first cell of a next frame. The last cell of a frame may be detected by scanning cell headers for data patterns identifying the last cell of a frame. In yet another embodiment, a combination of first-cell and last-cell detection may be used.

Outgoing cells exiting system 10 may be processed by the layer-3 router 34 within the last network access switch 14 reached by the outgoing cells before exiting system 10. As discussed above, cells communicated on system links 26 may have been formatted so as to contain system destination information. Since external devices, such as CO devices coupled to WAN link 22 or subscriber devices 12, may be unable to handle cells formatted in this way, and since the system destination information may only specify destinations associated with network access switches 14 rather than external devices, it may be necessary for layer-3 router 34 format some or all of the cells exiting system 10 such that they may be handled by such external devices. Conversely, cells entering system 10 from WAN link 22 may need to be formatted so as to include system destination information. In one embodiment, layer-2 router 32 selectively communicates to layer-3 router 34 those cells exiting system 10 that contain system destination information for an associated frame. System destination information associated with a frame may be encoded in fewer than all of the cells within the frame. In one embodiment, layer-2 router 32 scans all cells within each frame for system destination information. This may be preferable when, for example, system destination information is encoded in multiple cells within a frame communicated between network access switches 14 on one or more system links 26. In another embodiment, layer-2 router 32 detects cells that are the first cells of outgoing frames exiting system 10. This may be preferable when, for example, system destination information may be encoded in only the first cell of a frame communicated between network access switches 14 on one or more system links 26.

Cells exiting system 10 at network access switch 14 may need to be reformatted by layer-3 router 34 such that they can be handled by external devices. In one embodiment, layer-3 router 34 receives cells exiting system 10 at network access switch 14 that contain system destination information. Layer-3 router 34 then reformats the cells as standard ATM cells that can be handled by external devices. Cells may be reformatted in a number of ways. For example, in one embodiment, layer-3 router 34 reformats a cell by removing system destination information attached to the cell. In another embodiment, layer-3 router 34 reformats a cell by removing the system destination information from the VPI VCI, or both VPI and VCI fields of the cell header and replacing it with appropriate VPI, VCI, or both VPI and VCI numbers.

Certain cells within a data unit being processed by layer-3 router 34 may be temporarily stored by layer-2 router 32 as they are received, rather than being communicated to layer-3 router 34. Since layer-3 router 34 may need fewer than all of the cells within an incoming or outgoing frame to process the frame, layer-3 router 34 may complete its processing of a frame before all of the cells within the frame have been received at layer-2 switch 30 or layer-2 router 32. For example, in one embodiment, layer-2 router 32 communicates to layer-3 router 34 the first cell of a frame entering system 10 at network access switch 14 that needs to traverse one or more system links 26 before reaching its destination. Layer-2 router 32 may store, in memory 38 or otherwise, cells of the frame received while layer-3 router 34 is processing the frame using the first cell of the frame (or any other cell in the frame containing layer-3 routing information). Where cells other than the first cells of a frame contain layer-3 routing information or system destination information, layer-2 router 32 may store the first cells of a frame while waiting to receive those cells containing such information and while those cells are being processed by layer-3 router 34 after having been received. Cells may be stored such that they may be transmitted contiguously, in order, and in accordance with ATM conventions and Request for Comment (RFC) 1483 or any other appropriate standard. Cells may similarly be stored by layer-2 router 32 while layer-3 router 34 is processing an outgoing frame exiting system 10 at network access switch 14. Where layer-2 router 32 does not store such later-arriving cells within a frame, layer-3 router 34 may process the later-arriving cells in the same manner as earlier-arriving cells or may simply disregard such cells.

Layer-2 router 32 may use a traffic shaping device 40 to shape traffic flowing to destination ports on a per-port basis according to particular needs. Different levels of performance may be associated with different ports due to the purchasing of different services, different capabilities of different communication channels, and the like. Traffic shaping device 40 may be used to dynamically adjust traffic shaping, for example, in the event that local ports dynamically train to varying line speeds. Such dynamic adjustment may, for example, reduce the need to re-provision certain CO equipment as traffic conditions change.

In one embodiment, before cells exiting system 10 are switched out of network access switch 14, layer-2 router 32 determines whether the destination device is ready to receive the cells. The destination device may be any device external to system 10 that is the ultimate destination of cells to be switched out of network access switch 14, such as a CO device coupled to WAN 20, a subscriber device 12, or any other suitable device. For example only and not by way of limitation, such an external device may include an xDSL or other suitable modem. A destination device may not be ready to receive the cells if, for example, the device or subscriber port 18 supporting the connection with the destination device is busy handling other cells. Layer-2 router 32 may determine whether the destination device is ready to receive cells by performing a "handshake" or otherwise communicating with the device. Alternatively, layer-2 router 32 may determine whether the destination device is ready to receive cells by analyzing a clock signal to which layer-2 router 32 and the destination device are synchronized according to some existing arrangement. If layer-2 router 32 determines that the destination device is not ready to receive outgoing cells exiting system 10, layer-2 router 32 may store the cells in memory 38 until the destination device is ready. In this way, as cells are assigned to a destination port, they may be enqueued in a port-specific queue and forwarded to the destination port at a rate that satisfies the traffic-shaping requirements of that port, which may change dynamically. Layer-2 router 32 may also store cells when there are other cells ahead of the cells waiting to be switched out of network access switch 14, either to an external device or to another network access switch 14. For example, layer-2 router 32 may store a cell when there are other cells within the same frame ahead of that cell that are waiting to be switched out of network access switch 14. As discussed above, cells may be stored such that they may be transmitted contiguously, in order, and in accordance with ATM conventions and RFC 1483 or any other appropriate standard.

Layer-3 router 34 generally provides layer-3 routing functionality. Layer-3 routing functionality is appropriate for certain types of data blocks, such as ATM frames, FR frames, or IP packets, where the desired routing of the signals may vary from data unit to data unit and is determined by examining a portion of the contents of each data unit. In such cases (again referring to the particular case of ATM frames), the function of layer-3 router 34 may include examining individual data units being transported over inbound ATM VCs that will take them to their intended destination. In addition, layer-3 router 34 may perform tasks such as determining the system destinations of signals entering system 10 at network access switch 14, communicating system destination information to lower functional layers within network access switch 14, and reformatting signals exiting system 10 at network access switch 14. Lower functional layers may include layer-2 switch 30, layer-2 router 32, or both. As described above, layer-3 router 34 may need fewer than all of the signals within a data unit entering or exiting system 10 to process the data unit. Accordingly, layer-2 switching and layer-3 routing may be performed within a network access switch without using a full segmentation and reassembly (SAR) unit, eliminating costs associated with the use of such units.

Layer-3 router 34 may communicate system destination information to lower functional layers within network access switch 14 in a number of ways. For example, in one embodiment, layer-3 router 34 discards cells communicated to it and communicates only system destination information for the cells to lower functional layers. In another embodiment, layer-3 router 34 encodes system destination information into the cells communicated to it and then communicates the cells to lower functional layers. Layer-3 router 34 may encode system destination information into a cell in a number of ways. For example, layer-3 router 34 may encode system destination information into a cell by adding to the cell one or more bytes containing appropriate system destination information. Alternatively, layer-3 router 34 encodes system destination information in a cell by changing the VPI, VCI, or both VPI and VCI numbers in the cell to reflect appropriate system destination information.

As discussed above, cells entering system 10 at network access switch 14 may need to be formatted by layer-3 router 34 such that they contain system destination information specifying a system destination, such as a particular port of a particular destination network access switch 14. In one embodiment, layer-3 router 34 determines the system destination of a frame entering system 10 at network access switch 14 by analyzing layer-3 routing information in one or more cells of the frame. Once layer-3 router 34 has determined the system destination of the frame, layer-3 router 34 communicates the system destination information to lower functional layers within network access switch 14, such as layer-2 switch 30, layer-2 router 32, or both. As described above, system destination information is information that may be used by devices in system 10 to forward cells to their intended system destinations associated with network access switches 14 within system 10. System destination information may also be used by the layer-3 router at the network access switch 14 which is the point of exit from system 10 to reformat cells as standard ATM cells that may be handled by external devices. Accordingly, in one embodiment, system destination information includes two fields. One field may be used by network access switches 14 to switch cells to their system destination. The other field may be used by the layer-3 router at the network access switch 14 which is the point of exit from system 10 to reformat cells as standard ATM cells. In one embodiment, such tunneling allows an individual network access switch 14 to support only as many VCs as it may need for locally connected resources.

Figure 3A:
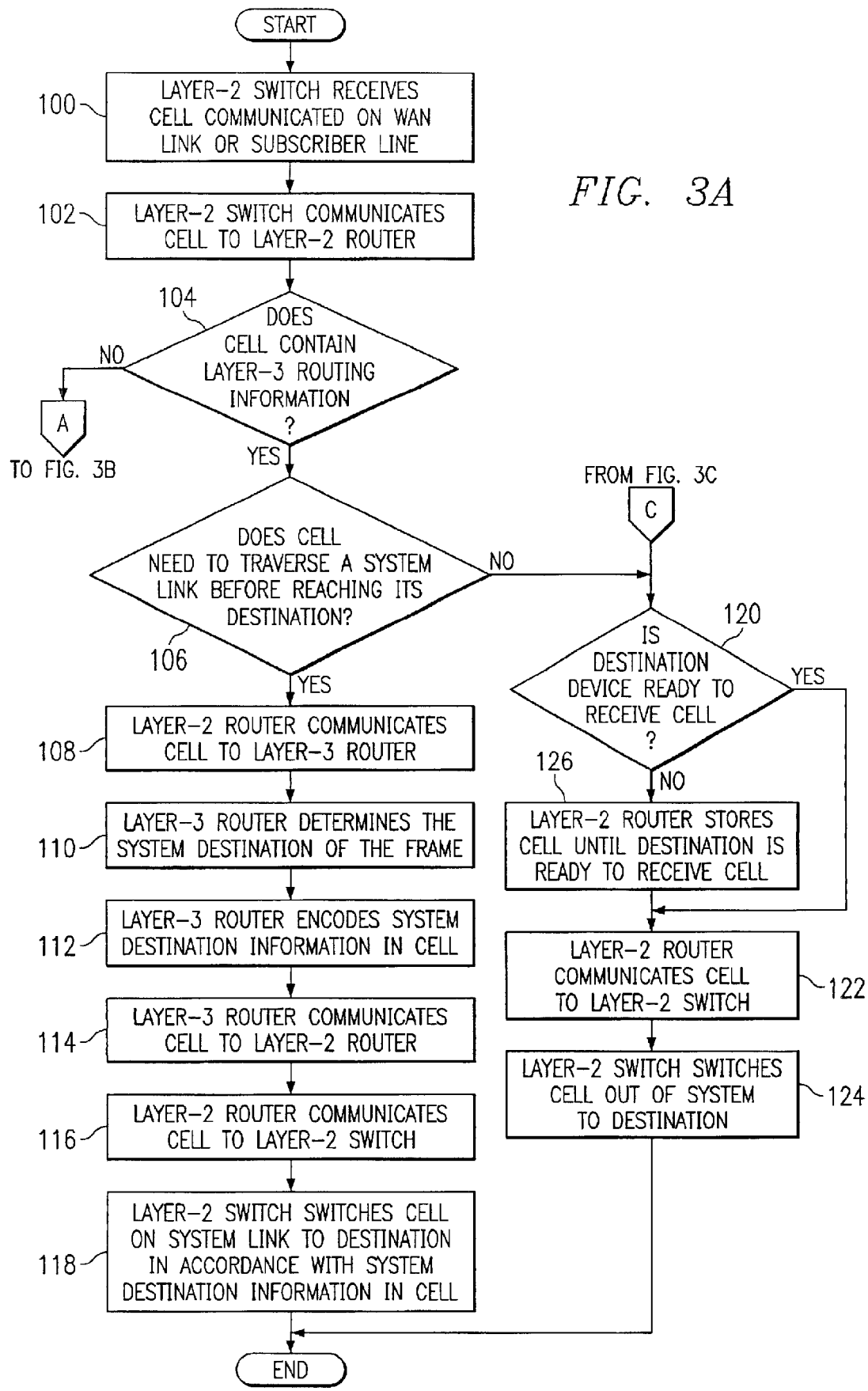
FIGS. 3A through 3C illustrate exemplary methods for switching and routing data associated with a subscriber community.
Figure 3B:
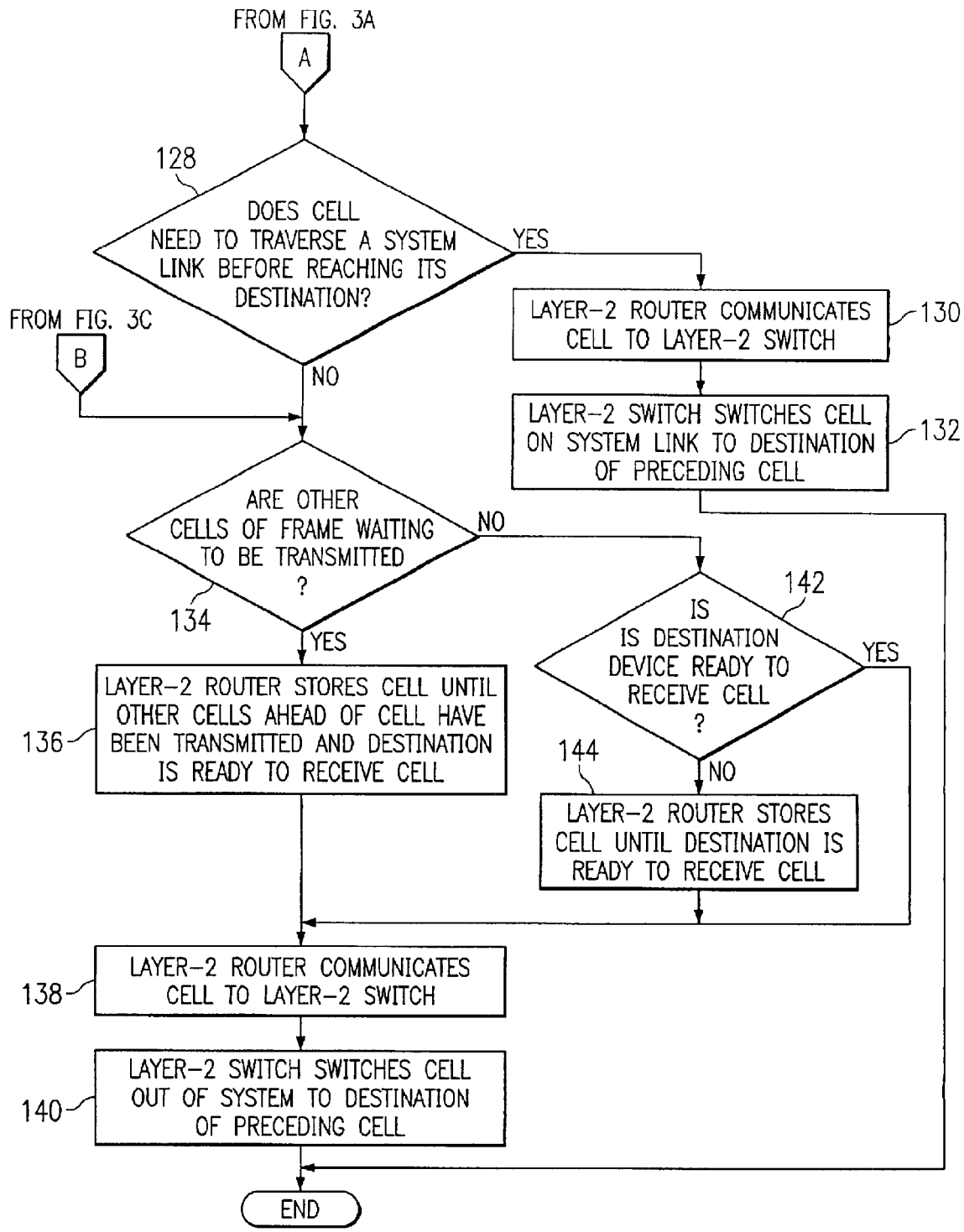
Figure 3C:
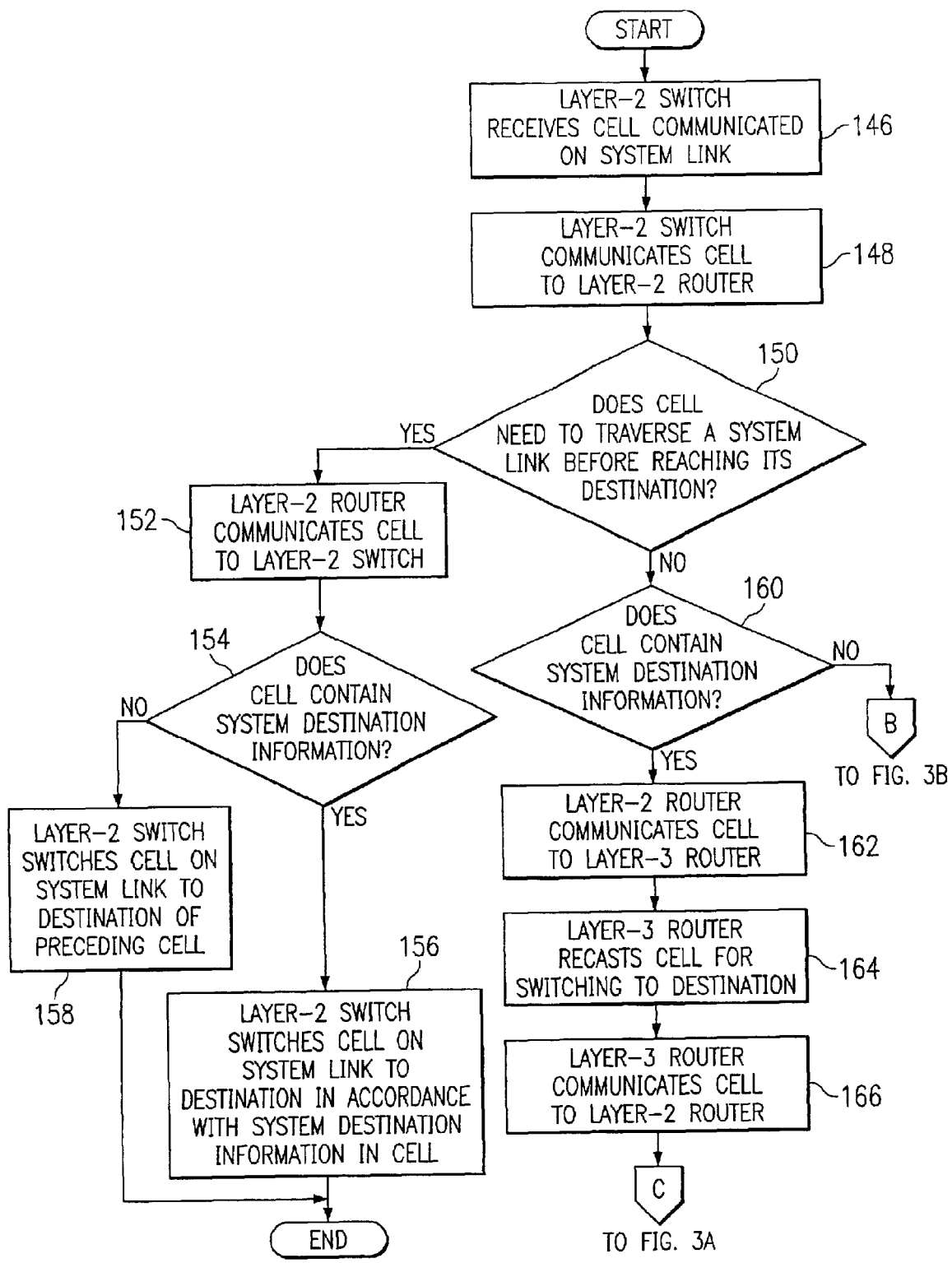

FIGS. 3A through 3C illustrate exemplary methods for switching and routing data associated with a subscriber community. Although the methods are described primarily with respect to ATM cells and frames, the present invention contemplates signals being formatted in any appropriate manner. Referring to FIGS. 3A and 3C for cells entering system 10 at a network access switch 14 which is the entry point for the cells into system 10, the method begins at step 100, where layer-2 switch 30 receives a cell communicated on an associate WAN link 22 or subscriber line 16. Layer-2 switch 30 communicates the cell to layer-2 router 32 at step 102. At step 104, layer-2 router 32 determines whether the cell contains layer-3 routing information using any suitable technique. If the cell contains layer-3 routing information, the method proceeds to step 106, where layer-2 router 32 determines whether the cell needs to traverse one or more of system links 26 before reaching its destination. As discussed above, layer-2 router 32 may make this determination by referring to translation lookup table 36 or in any other suitable manner. If the cell needs to traverse one or more system links 26 before reaching its destination, layer-2 router 32 communicates the cell to layer-3 router 34 at step 108. In one embodiment, the combined effect of steps 104 and 106 is that layer-3 router 34 receives only those cells entering system 10 at network access switch 14 that contain layer-3 routing information and need to be communicated between network access switches 14 in system 10. As discussed above, layer-2 router 32 may also selectively communicate to layer-3 router 34 incoming cells that contain layer-3 routing information and are to be switched out of the same network access switch 14 onto WAN link 22 or a subscriber line 16 (without traversing one or more system links 26).

Layer-3 router 34 receives the cell and, at step 110, determines the system destination of the frame that includes the cell in the manner described above. Once a system destination has been determined, layer-3 router 34 communicates system destination information to lower functional layers within network access switch 14 by encoding system destination information in the cell at step 112 and communicating the cell to layer-2 router 32 at step 114. Layer-2 router 32 receives the cell and, at step 116, communicates the cell to layer-2 switch 30. At step 118, layer-2 switch 30 switches the cell toward its destination on the appropriate system link 26 according to the system destination information encoded in the cell, and the method ends.

Referring again to step 106, if the cell does not need to traverse one or more system links 26 before reaching its destination, the method proceeds to step 120, where layer-2 router 32 determines whether the destination device is ready to receive the cell. As described above, this determination may be made in a number of ways. If the destination device is ready to receive the cell, layer-2 router 32 communicates the cell to layer-2 switch 30 at step 122, layer-2 switch switches the cell out of system 10 on WAN link 22 or a subscriber line 16 to its destination at step 124, and the method ends. If the destination device is not ready to receive the cell at step 120, the method proceeds to step 126, where layer-2 router 32 temporarily stores the cell until the destination device is ready to receive the cell. When the destination device is ready, the method resumes at step 122.

Referring again to step 104, if the cell is not the first cell of a frame (used in this particular example as a proxy for whether the cell contains layer-3 routing information), the method proceeds to step 128, where layer-2 router 32 determines whether the cell needs to traverse one or more system links 26 before reaching its destination. If the cell needs to traverse one or more system links 26, layer-2 router 32 communicates the cell to layer-2 switch 30 at step 130. At step 132, layer-2 switch 30 switches the cell on one of the system links 26 to the destination of the preceding cell, and the method ends. Accordingly, cells after the first cell of a frame needing to traverse one or more system links 26 are switched to the destination of the first cell of the frame.

If the cell does not need to traverse one or more system links 26 before reaching its destination at step 128, the method proceeds to step 134, where layer-2 router 32 determines whether other cells of the frame are waiting to be switched out of system 10 to the destination. If other cells are waiting to be switched out of system 10 at network access switch 14, layer-2 router 32 temporarily stores the cell at step 136 until other cells of the frame ahead of the cell have been switched out of system 10 and the destination device is ready to receive the cell. When the destination device is ready to receive the cell, layer-2 router 32 communicates the cell to layer-2 switch 30 at step 138, and, at step 140, layer-2 switch 30 switches the cell on WAN link 22 or subscriber line 16 to the destination of the preceding cell. Accordingly, cells after the first cell of a frame exiting system 10 are switched out of system 10 to the destination of the first cell of the frame.

If no other cells of the frame are waiting to be switched out of system 10 to the appropriate destination at step 134, the method proceeds to step 142, where layer-2 router 32 determines whether the destination device is ready to receive the cell. If the destination device is ready to receive the cell, the method resumes at step 138. If the destination device is not ready to receive the cell, the method instead proceeds to step 144, where layer-2 router 32 temporarily stores the cell until the destination device is ready to receive the cell. When the destination device is ready, the method resumes at step 138.

Referring to FIG. 3C for cells received at network access switch 14 on one of the system links 26, the method begins at step 146, where layer-2 switch 30 receives a cell. At step 148, layer-2 switch 30 communicates the cell to layer-2 router 32. At step 150, layer-2 router 32 determines whether the cell needs to traverse one or more system links 26 before reaching its destination. If the cell needs to traverse one or more system links 26, layer-2 router 32 communicates the cell to layer-2 switch 30 at step 152. It is then determined at step 154 whether the cell contains system destination information. If the cell contains system destination information, the method proceeds to step 156, where layer-2 switch 30 switches the cell out of network access switch 14 on a system link 26 to its destination according to the system destination information in the cell, and the method ends. If the cell does not contain system destination information, the method proceeds to step 158, where layer-2 switch 30 switches the cell to the destination of the preceding cell on a system link 26, and the method ends.

Referring again to step 150, if the cell does not need to traverse one or more system links 26 before reaching its destination, the method proceeds to step 160, where it is determined whether the cell contains system destination information. If the cell does not contain system destination information, the method proceeds to step 134 of FIG. 3B. If the cell contains system destination information, the method proceeds to step 162, where layer-2 router 32 communicates the cell to layer-3 router 34. Layer-3 router then reformats the cell as a standard ATM or other suitable cell at step 164 for switching out of system 10 so that the cell can be handled by an appropriate external device. As described above, cells may be reformatted as standard ATM cells or other suitable layer-2 data units in a number of ways. After the cell has been reformatted, layer-3 router 34 communicates the cell to layer-2 router 32 at step 166, and the method proceeds to step 120 of FIG. 3A.

Although the present invention has been described with several embodiments, divers changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for switching and routing data associated with one or more subscribers within a subscriber community, comprising:

layer-2 switching functionality within a first network access switch, the layer-2 switching functionality operable to:
    receive data units communicated by one or more external devices using one or more external links;
    receive data units communicated by layer-2 switching functionality of one or more other network access switches using one or more system links; and
    switch the received data units for communication to an intermediate device within the first network access switch coupling the layer-2 switching functionality within the first network access switch to layer-3 routing functionality within the first network access switch; and the intermediate device, operable to:
    receive the switched data units from the layer-2 switching functionality;
    selectively communicate to the layer-3 routing functionality one or more first data units that have been received by the layer-2 switching functionality on an external link and are to be subsequently switched for communication to layer-2 switching functionality of another network access switch on an associated system link, the first data units containing layer-3 routing information for a first data block comprising the first data units and a plurality of other data units, the first data units being communicated to the layer-3 routing functionality for processing including a determination of a system destination for the first data block that comprises an address of another network access switch that is associated with an external link coupled to the other network access switch;
    selectively communicate to the layer-3 routing functionality one or more second data units that have been received by the layer-2 switching functionality on a system link and are to be subsequently switched for communication to an external device on an associated external link, the second data units containing incoming system destination information specifying an address of the first network access switch that is associated with that external link, the incoming system destination information allowing a second data block comprising the second data units and a plurality of other data units to be switched and routed between two or more network access switches, the second data units being communicated to the layer-3 routing functionality for processing including formatting the second data units as standard layer-2 data units for switching and routing by external devices;
    selectively store third data units, the third data units being data units within the first data block that have been communicated to the intermediate device after the layer-3 routing functionality has begun to determine a system destination for the first data block and before all other data units within the first data block ahead of the third data units have been switched for communication to the layer-2 switching functionality of the other network access switch; and
    selectively store fourth data units, the fourth data units being data units within the second data block that have been communicated to the intermediate device after the layer-3 routing functionality has begun to format the second data units and before all other data units within the second data block ahead of the fourth data units have been switched for communication to the external device.

2. The system of claim 1, wherein the intermediate device is further operable to selectively communicate fifth data units back to the layer-2 switching functionality without communicating the fifth data units to the layer-3 routing-functionality, the fifth data units being data units received by the layer-2 switching functionality on a system link to be subsequently switched onto another system link.

3. The system of claim 1, wherein the layer-3 routing functionality is operable to:

receive the first data units and the second data units from the intermediate device;
  analyze the layer-3 routing information in the first data units to determine a system destination for the first data block, the system destination being an address of another network access switch that is associated with an external link coupled to the other network access switch;
  communicate outgoing system destination information reflecting the system destination for the first data block to the intermediate device; and
  modify the format the second data units containing the incoming system destination information as standard layer-2 data units for subsequent switching and routing by external devices.

4. The system of claim 1, wherein the layer-3 routing information comprises an Internet Protocol (IP) address.

5. The system of claim 1, wherein the plurality of network access switches are configured to appear to external device as a single network access switch.

6. The system of claim 1, wherein the intermediate device is operable to store the third data units and the fourth data units in a particular order such that the layer-2 switching functionality can switch the third data units and the fourth data units contiguously, in order, and according to ATM conventions and Request for Comment (RFC) 1483.

7. The system of claim 1, wherein the intermediate device is further operable to:

determine whether an external device coupled to the layer-2 switching functionality using an external link is ready to receive data units;

store the data units until the external device is ready to receive the data units; and communicate the data units to the layer-2 switching functionality when the external device is ready to receive the data units so that the layer-2 switching functionality can subsequently switch the data units for communication to the external device on an associated external link at a rate that satisfies a traffic-shaping requirement for the external device.

8. The system of claim 7, wherein the intermediate device is operable to store the data units by assigning the data units to a queue dedicated to a port of the first network access switch that is associated with the external link.

9. The system of claim 7, wherein the rate changes dynamically in response to the external device retraining to a different speed.

10. The system of claim 7, wherein:

a port of the first network access switch associated with an external link supports at least a first virtual circuit (VC) and a second VC, the first VC and the second VC being concentrated into a carrier VC and potentially having different traffic-shaping requirements; and the layer-2 switching functionality is operable to switch sixth data units onto the carrier VC at a rate that satisfies the traffic-shaping requirement for the first VC and switch seventh data units onto the carrier VC at a rate that satisfies the traffic-shaping requirement for the second VC.

11. The system of claim 7, wherein the intermediate device determines whether the external device is ready to receive the data units by communicating with the external device.

12. The system of claim 11, wherein the intermediate device determines whether the external device is ready to receive the data units by performing a handshake with the external device.

13. The system of claim 7, wherein the intermediate device determines whether the external device is ready to receive the data units by analyzing a clock signal to which the intermediate device and the external device are synchronized.

14. A system for switching and routing data associated with one or more subscribers within a subscriber community, comprising:

layer-2 switching functionality within a first network access switch, the layer-2 switching functionality operable to:

receive data units communicated by one or more external devices using one or more external links; and switch the received data units for communication to an intermediate device within the first network access switch coupling the layer-2 switching functionality within the first network access switch to layer-3 routing functionality within the first network access switch;

the intermediate device, operable to:

receive the switched data units from the layer-2 switching functionality;

selectively communicate to the layer-3 routing functionality one or more first data units that have been received by the layer-2 switching functionality on an external link and are to be subsequently switched for communication to layer-2 switching functionality of another network access switch on an associated system link, the first data units containing layer-3 routing information for a data block comprising the first data units and a plurality of other data units, the first data units being communicated to the layer-3 routing functionality for processing including a determination of a system destination for the data block that comprises an address of another network access switch that is associated with an external link coupled to the other network access switch; and selectively store second data units, the second data units being data units within the data block that have been communicated to the intermediate device after the layer-3 routing functionality has begun to determine a system destination for the data block and before all other data units within the data block ahead of the second data units have been switched for communication to the layer-2 switching functionality of the other network access switch.

15. A system for switching and routing data associated with one or more subscribers within a subscriber community, comprising:

layer-2 switching functionality within a first network access switch, the layer-2 switching functionality operable to:

receive data units communicated by layer-2 switching functionality of one or more other network access switches using one or more system links; and switch the received data units for communication to an intermediate device within the first network access switch coupling the layer-2 switching functionality within the first network access switch to layer-3 routing functionality within the first network access switch;

the intermediate device, operable to:

receive the switched data units from the layer-2 switching functionality;

selectively communicate to the layer-3 routing functionality one or more first data units that have been received by the layer-2 switching functionality on a system link and are to be subsequently switched for communication to an external device on an associated external link, the first data units containing incoming system destination information specifying an address of the first network access switch that is associated with that external link, the incoming system destination information allowing a data block comprising the first data units and a plurality of other data units to be switched and routed between two or more network access switches, the first data units being communicated to the layer-3 routing functionality for processing including formatting the first data units as standard layer-2 data units for switching and routing by external devices; and selectively store second data units, the second data units being data units within the data block that have been communicated to the intermediate device after the layer-3 routing functionality has begun to format the first data units and before all other data units within the data block ahead of the second data units have been switched for communication to the external device.

16. A system for switching and routing data associated with one or more subscribers within a subscriber community, comprising:

first means within a first network access switch, for:

receiving data units communicated by one or more external devices using one or more external links;

receiving data units communicated by layer-2 switching functionality of one or more other network access switches using one or more system links; and switching the received data units for communication to second means within the first network access switch coupling the first means within the first network access switch to third means within the first network access switch;

the second means, for:
receiving the switched data units from the first means;
selectively communicating to the third means one or more first data units that have been received by the first means on an external link and are to be subsequently switched for communication to layer-2 switching functionality of another network access switch on an associated system link, the first data units containing layer-3 routing information for a first data block comprising the first data units and a plurality of other data units, the first data units being communicated to the third means for processing including a determination of a system destination for the first data block that comprises an address of another network access switch that is associated with an external link coupled to the other network access switch;
selectively communicating to the third means one or more second data units that have been received by the first means on a system link and are to be subsequently switched for communication to an external device on an associated external link, the second data units containing incoming system destination information specifying an address of the first network access switch that is associated with that external link, the incoming system destination information allowing a second data block comprising the second data units and a plurality of other data units to be switched and routed between two or more network access switches, the second data units being communicated to the third means for processing including formatting the second data units as standard layer-2 data units for switching and routing by external devices;
selectively storing third data units, the third data units being data units within the first data block that have been communicated to the second means after the third means has begun to determine a system destination for the first data block and before all other data units within the first data block ahead of the third data units have been switched for communication to the layer-2 switching functionality of the other network access switch; and
selectively storing fourth data units, the fourth data units being data units within the second data block that have been communicated to the second means after the third means has begun to format the second data units and before all other data units within the second data block ahead of the fourth data units have been switched for communication to the external device.

17. A method for switching and routing data associated with one or more subscribers within a subscriber community, comprising:

using layer-2 switching functionality within a first network access switch:
receiving data units communicated by one or more external devices using one or more external links;
receiving data units communicated by layer-2 switching functionality of one or more other network access switches using one or more system links; and
switching the received data units for communication to an intermediate device within the first network access switch coupling the layer-2 switching functionality within the first network access switch to layer-3 routing functionality within the first network access switch; and using the intermediate device:
receiving the switched data units from the layer-2 switching functionality;
selectively communicating to the layer-3 routing functionality one or more first data units that have been received by the layer-2 switching functionality on an external link and are to be subsequently switched for communication to layer-2 switching functionality of another network access switch on an associated system link, the first data units containing layer-3 routing information for a first data block comprising the first data units and a plurality of other data units, the first data units being communicated to the layer-3 routing functionality for processing including a determination of a system destination for the first data block that comprises an address of another network access switch that is associated with an external link coupled to the other network access switch;
selectively communicating to the layer-3 routing functionality one or more second data units that have been received by the layer-2 switching functionality on a system link and are to be subsequently switched for communication to an external device on an associated external link, the second data units containing incoming system destination information specifying an address of the first network access switch that is associated with that external link, the incoming system destination information allowing a second data block comprising the second data units and a plurality of other data units to be switched and routed between two or more network access switches, the second data units being communicated to the layer-3 routing functionality for processing including formatting the second data units as standard layer-2 data units for switching and routing by external devices;
selectively storing third data units, the third data units being data units within the first data block that have been communicated to the intermediate device after the layer-3 routing functionality has begun to determine a system destination for the first data block and before all other data units within the first data block ahead of the third data units have been switched for communication to the layer-2 switching functionality of the other network access switch; and
selectively storing fourth data units, the fourth data units being data units within the second data block that have been communicated to the intermediate device after the layer-3 routing functionality has begun to format the second data units and before all other data units within the second data block ahead of the fourth data units have been switched for communication to the external device.

18. The method of claim 17, wherein using the intermediate device further comprises selectively communicating fifth data units back to the layer-2 switching functionality without communicating the fifth data units to the layer-3 routing-functionality, the fifth data units being either data units received by the layer-2 switching functionality on an external link to be subsequently switched onto another external link or data units received by the layer-2 switching functionality on a system link to be subsequently switched onto another system link.

19. The method of claim 17, further comprising, using the layer-3 routing functionality:
receiving the first data units and the second data units from the intermediate device;
analyzing the layer-3 routing information in the first data units to determine a system destination for the first data block, the system destination being an address of another network access switch that is associated with an external link coupled to the other network access switch;
communicating outgoing system destination information reflecting the system destination for the first data block to the intermediate device; and
formatting the second data units containing the incoming system destination information as standard layer-2 data units for subsequent switching and routing by external devices.

20. The method of claim 17, wherein the layer-3 routing information comprises an Internet Protocol (IP) address.

21. The method of claim 17, wherein the plurality of network access switches are configured to appear to external device as a single network access switch.

22. The method of claim 17, wherein storing the third data units and the fourth data units comprises storing the third data units and the fourth data units in a particular order such that the layer-2 switching functionality can switch the third data units and the fourth data units contiguously, in order, and according to ATM conventions and Request for Comment (RFC) 1483.

23. The method of claim 17, wherein using the intermediate device further comprises:
determining whether an external device coupled to the layer-2 switching functionality using an external link is ready to receive data units;
storing the data units until the external device is ready to receive the data units; and
communicating the data units to the layer-2 switching functionality when the external device is ready to receive the data units so that the layer-2 switching functionality can subsequently switch the data units for communication to the external device on an associated external link at a rate that satisfies a traffic-shaping requirement for the external device.

24. The method of claim 23, wherein storing the data units comprises assigning the data units to a queue dedicated to a port of the first network access switch that is associated with the external link.

25. The method of claim 23, wherein the rate changes dynamically in response to the external device retraining to a different speed.

26. The method of claim 23, wherein:
a port of the first network access switch associated with an external link supports at least a first virtual circuit (VC) and a second VC, the first VC and the second VC being concentrated into a carrier VC and potentially having different traffic-shaping requirements; and
the layer-2 switching functionality is operable to switch sixth data units onto the carrier VC at a rate that satisfies the traffic-shaping requirement for the first VC and switch seventh data units onto the carrier VC at a rate that satisfies the traffic-shaping requirement for the second VC.

27. The method of claim 23, wherein determining whether the external device is ready to receive the data units comprises communicating with the external device.

28. The method of claim 27, wherein determining whether the external device is ready to receive the data units comprises performing a handshake with the external device.

29. The method of claim 23, wherein determining whether the external device is ready to receive the data units comprises analyzing a clock signal to which the intermediate device and the external device are synchronized.

30. A method for switching and routing data associated with one or more subscribers within a subscriber community, comprising:
using layer-2 switching functionality within a first network access switch:
receiving data units communicated by one or more external devices using one or more external links; and
switching the received data units for communication to an intermediate device within the first network access switch coupling the layer-2 switching functionality within the first network access switch to layer-3 routing functionality within the first network access switch; and
using the intermediate device:
receiving the switched data units from the layer-2 switching functionality;
selectively communicating to the layer-3 routing functionality one or more first data units that have been received by the layer-2 switching functionality on an external link and are to be subsequently switched for communication to layer-2 switching functionality of another network access switch on an associated system link, the first data units containing layer-3 routing information for a data block comprising the first data units and a plurality of other data units, the first data units being communicated to the layer-3 routing functionality for processing including a determination of a system destination for the data block that comprises an address of another network access switch that is associated with an external link coupled to the other network access switch; and
selectively storing second data units, the second data units being data units within the data block that have been communicated to the intermediate device after the layer-3 routing functionality has begun to determine a system destination for the data block and before all other data units within the data block ahead of the second data units have been switched for communication to the layer-2 switching functionality of the other network access switch.

31. A method for switching and routing data associated with one or more subscribers within a subscriber community, comprising:
using layer-2 switching functionality within a first network access switch:
receiving data units communicated by layer-2 switching functionality of one or more other network access switches using one or more system links; and
switching the received data units for communication to an intermediate device within the first network access switch coupling the layer-2 switching functionality within the first network access switch to layer-3 routing functionality within the first network access switch; and
using the intermediate device:
receiving the switched data units from the layer-2 switching functionality;
selectively communicating to the layer-3 routing functionality one or more first data units that have been received by the layer-2 switching functionality on a system link and are to be subsequently switched for communication to an external device on an associated external link, the first data units containing incoming system destination information specifying an address of the first network access switch that is associated with that external link, the incoming system destination information allowing a data block comprising the first data units and a plurality of other data units to be switched and routed between two or more network access switches, the first data units being communicated to the layer-3 routing functionality for processing including formatting the first data units as standard layer-2 data units for switching and routing by external devices; and selectively storing second data units, the second data units being data units within the data block that have been communicated to the intermediate device after the layer-3 routing functionality has begun to format the first data units and before all other data units within the data block ahead of the second data units have been switched for communication to the external device.

32. Logic for switching and routing data associated with one or more subscribers within a subscriber community, the logic embodied in media and operable to:

use layer-2 switching functionality within a first network access switch to:

receive data units communicated by one or more external devices using one or more external links;

receive data units communicated by layer-2 switching functionality of one or more other network access switches using one or more system links; and switch the received data units for communication to an intermediate device within the first network access switch coupling the layer-2 switching functionality within the first network access switch to layer-3 routing functionality within the first network access switch; and use the intermediate device to:

receive the switched data units from the layer-2 switching functionality;

selectively communicate to the layer-3 routing functionality one or more first data units that have been received by the layer-2 switching functionality on an external link and are to be subsequently switched for communication to layer-2 switching functionality of another network access switch on an associated system link, the first data units containing layer-3 routing information for a first data block comprising the first data units and a plurality of other data units, the first data units being communicated to the layer-3 routing functionality for processing including a determination of a system destination for the first data block that comprises an address of another network access switch that is associated with an external link coupled to the other network access switch;

selectively communicate to the layer-3 routing functionality one or more second data units that have been received by the layer-2 switching functionality on a system link and are to be subsequently switched for communication to an external device on an associated external link, the second data units containing incoming system destination information specifying an address of the first network access switch that is associated with that external link, the incoming system destination information allowing a second data block comprising the second data units and a plurality of other data units to be switched and routed between two or more network access switches, the second data units being communicated to the layer-3 routing functionality for processing including formatting the second data units as standard layer-2 data units for switching and routing by external devices;

selectively store third data units, the third data units being data units within the first data block that have been communicated to the intermediate device after the layer-3 routing functionality has begun to determine a system destination for the first data block and before all other data units within the first data block ahead of the third data units have been switched for communication to the layer-2 switching functionality of the other network access switch; and selectively store fourth data units, the fourth data units being data units within the second data block that have been communicated to the intermediate device after the layer-3 routing functionality has begun to format the second data units and before all other data units within the second data block ahead of the fourth data units have been switched for communication to the external device.

* * * * *